No. 612,805. Patented Oct. 18, 1898.
A. H. HOWLAND.
SPRINKLING VEHICLE.
(Application filed Aug. 9, 1897.)

(No Model.)

Witnesses:
A. F. Durand.
Margaret M. Wagner.

Inventor:
Arthur H. Howland.
by Page & Belfield

UNITED STATES PATENT OFFICE.

ARTHUR H. HOWLAND, OF WORCESTER, MASSACHUSETTS, ASSIGNOR TO FREDERICK C. AUSTIN, OF CHICAGO, ILLINOIS.

SPRINKLING-VEHICLE.

SPECIFICATION forming part of Letters Patent No. 612,805, dated October 18, 1898.

Application filed August 9, 1897. Serial No. 647,583. (No model.)

*To all whom it may concern:*

Be it known that I, ARTHUR H. HOWLAND, a citizen of the United States, residing at Worcester, in the county of Worcester and State of Massachusetts, have invented a certain new and useful Improvement in Sprinkling-Vehicles, of which the following is a specification.

My invention relates to sprinkling-vehicles—such as sprinkling wagons, carts, cars, and the like—which are adapted for service in sprinkling fluids on the ground, especially on streets and roads.

The principal object of my invention is to increase the extent of transverse projection of the fluid, so as, for example, to allow the entire width of a street, road, or any surface to be sprinkled during a single passage of the vehicle.

Other objects which I contemplate in accomplishing this result are to avoid noise such as might frighten horses; to avoid the interference with other vehicles, persons, or obstructions in the street, such as the supporting-posts of elevated structures, trolley-poles, &c.; to prevent longitudinal projection of the fluid simultaneously with its transverse projection, and to procure such results in an efficient, inexpensive, and practical manner.

To the attainment of the foregoing and other useful ends my invention contemplates subjecting the fluid to artificial pressure, so that it may be projected transversely to regions desirably remote laterally from the path of travel of the vehicle, and then discharging it out of suitable sprinkling heads or devices of any kind, so that it will spray or sprinkle such remote regions and also the regions intervening between the same and the vehicle. In this way large areas can be sprinkled at a single passage of the vehicle and the expense and inconvenience of repeated passages thereof avoided. The power for thus subjecting the fluid to artificial pressure is desirably obtained from the source of energy which serves to propel the vehicle—as, for example, where an electric car is employed as the vehicle, from the motor propelling the car or from a separate motor drawing its energy from the same source as does the car-motor.

Figure 1:
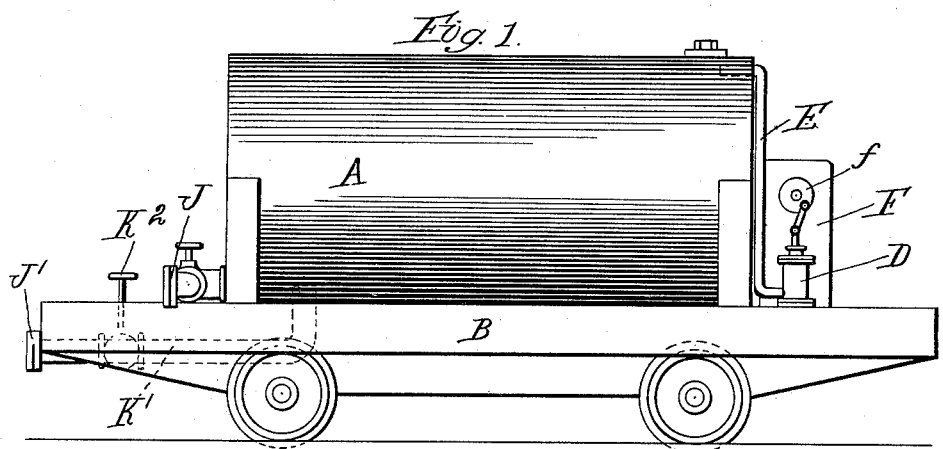
Figure 2:
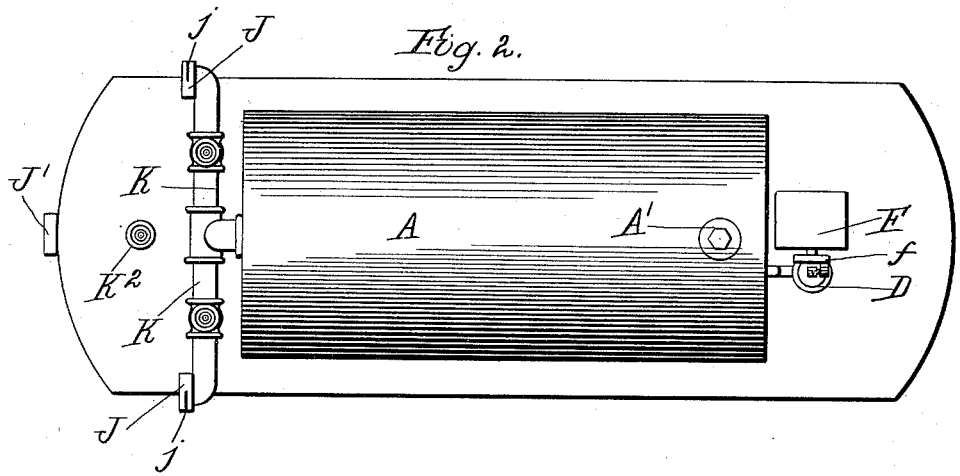
Figure 3:
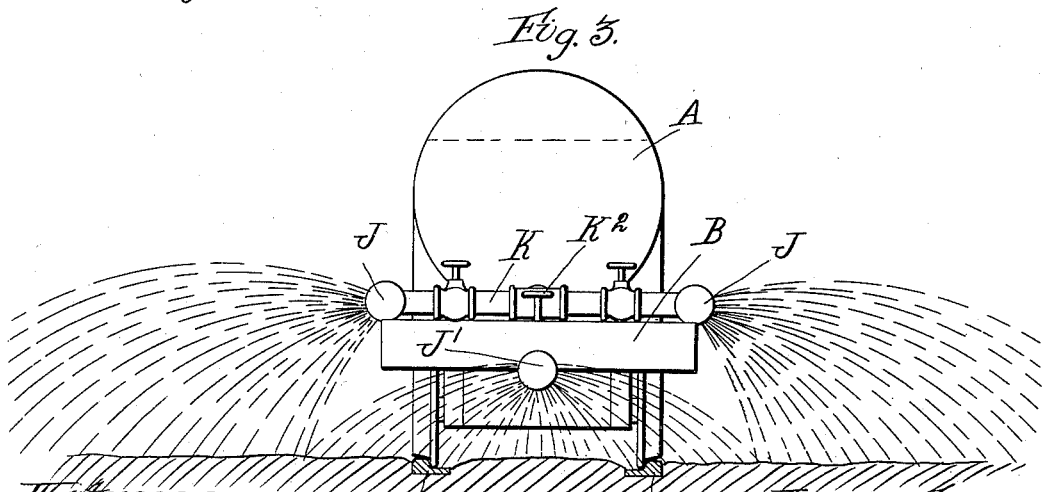

In the accompanying drawings, Figures 1, 2, and 3 are respectively a side elevation, plan, and end elevation of a sprinkling-car embodying my invention.

The sprinkling fluid employed for sprinkling purposes is carried by some suitable carrier—such, for example, as the cylindrical tank or reservoir A. When the tank A is employed, it can be filled with water by first removing a suitable plug or manhole-cover A', which is fitted into its side near one of its ends, and by then applying a hose to the opening or hole thus uncovered.

The tank A can be mounted upon any suitable vehicle, such as a wagon, cart, car, or the like. In the drawings I have shown it carried by, and to such end arranged longitudinally upon the platform of, an electrically-propelled car B, which latter is adapted to travel upon the tracks or rails C C.

In the arrangement illustrated the sprinkling fluid in the tank A is subjected to the pressure of air, which is forced into such tank by any suitable means—as, for example, by an air-pump D, conveniently mounted upon one end of the car-platform and connected with the tank A by a pipe E, which communicates with the upper portion of the interior thereof.

As a simple and convenient arrangement for operating the air-pump D it is connected with the rotary crank-wheel $f$ of an electric motor F, mounted on one end of the car-platform. The electric motor F is as a preferred arrangement understood to be suitably connected for operation and regulation with the source of electrical energy which is utilized in propelling the car. The sprinkling fluid thus held under pressure can be projected so as to properly spray or sprinkle the ground by means of any suitable sprinkling devices. As a simple and effective arrangement it is projected transversely from the transverse openings $j$ $j$ of two oppositely-arranged and independently-controlled sprinkling-heads J J, which are positioned at the sides of the car and are elevated to an extent to allow the fluid to move suitably outward to regions desirably remote before dropping to the ground. By thus employing two sprinkling-heads J J either side of the path of travel of the car can be sprinkled independently of the other when it is desired to do so.

The sprinkling-heads J J are connected with the holder containing fluid under pressure by suitable valved pipes K K.

While the elevated side sprinkling-heads J J could be arranged so as to sprinkle the path of travel of the car, I desirably provide a third head J' for such purpose, so that either the path of travel of the car or the portions of the road to the sides thereof can be independently sprinkled. This third sprinkling-head J' is conveniently positioned at the middle of one end of the car-platform and is connected with the tank A by a suitable pipe K', which is arranged below the forward portion of the car-platform and provided with a valve having an adjusting-wheel $K^2$, which is arranged above the platform, so as to be easily accessible for adjustment.

It will thus be seen that by my invention I can project the sprinkling fluid transversely to a considerable extent to either side of the path of travel of the sprinkling-vehicle and that the extent of such transverse projection can be varied by varying the degree of pressure to which the fluid is subjected. It will also be seen that I procure such extensive transverse projection of the fluid without employing expensive and cumbersome laterally-extending mechanical arrangements which would interfere with obstacles near the path of travel of the vehicle and that the fluid is projected directly in a direction transverse to the path of travel of the vehicle and not in a forward or backward direction. It will be further seen that by my invention a car or the like which cannot be conveniently turned around can be operated with equal facility while running in either direction, it being assumed that the car is provided with the usual means whereby an operator can control it from either end or when running in either direction.

With further reference to the construction hereinbefore set forth it will be easily seen that in case electrical energy is not available for procuring power for subjecting the sprinkling fluid to pressure—as, for example, on cable-cars—such energy can be procured by a friction connection with one of the rotary supporting wheels or axles of the vehicle or in any other suitable or well-known way.

It will be understood that the arrangement herein shown of the tank or reservoir, the pump, &c., upon the car can be varied at will without departing from the spirit of my invention.

What I claim as my invention is—

1. A sprinkling car or vehicle comprising a suitable body-frame; an air-tight tank or reservoir mounted upon said body-frame and adapted to contain the sprinkling fluid; an air-pump mounted upon said vehicle and connected and arranged to force air into said tank, whereby the said sprinkling fluid will be subjected to pressure; independently-controlled sprinkling-heads arranged at opposite sides of the said vehicle, and adapted to project the sprinkling fluid transversely from the sides of said vehicle, for the purpose of sprinkling the side portions of the street; means for sprinkling the path of travel of said vehicle; and means whereby the said air-pump may be operated independently of the motion of the said car or vehicle, substantially as described.

2. A sprinkling car or vehicle comprising a suitable body-frame; an air-tight tank or reservoir mounted upon said body-frame, and adapted to contain the sprinkling fluid; an air pump or compressor mounted upon said vehicle and connected and arranged to force air into said tank, whereby the said sprinkling fluid will be subjected to pressure; an independently-controlled sprinkling-head connected with said tank and arranged to sprinkle the path of travel of said vehicle; separately-controlled sprinkling-heads, arranged at opposite sides of the said vehicle and adapted to project the sprinkling fluid transversely from the sides of said vehicle, for the purpose of sprinkling the side or marginal portions of the street; and an electric motor arranged for operating said air-pump, substantially as described.

3. In an electrically-propelled sprinkling-car, the combination of a vehicle frame or body; an air-tight tank or reservoir mounted upon said vehicle-frame and adapted to contain sprinkling fluid; an air-pump mounted upon said vehicle and connected and arranged to force air into said tank, whereby the said sprinkling fluid will be subjected to pressure; an electric motor for operating the said air-pump; an independently-controlled sprinkling-head connected with said tank and arranged to sprinkle the path of travel of said vehicle; and separately-controlled sprinkling-heads arranged at opposite sides of the said vehicle and adapted to project the sprinkling fluid transversely from the sides of said vehicle, for the purpose of sprinkling the side or marginal portions of the street, substantially as described.

ARTHUR H. HOWLAND.

Witnesses:
MARGARET M. WAGNER,
ARTHUR F. DURAND.